United States Patent [19]

Shirasaka

[11] Patent Number: 6,103,852

[45] Date of Patent: *Aug. 15, 2000

[54] METHOD FOR PREPARING AMORPHOUS POLYMER CHAINS IN ELASTOMERS

[75] Inventor: Hitoshi Shirasaka, Yokohama, Japan

[73] Assignees: Hokushin Corporation, Kanagawa; Daicel Chemical Industries, Tokyo, both of Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/758,882

[22] Filed: Dec. 2, 1996

[30] Foreign Application Priority Data

Dec. 1, 1995 [JP] Japan .................................. 7-313842

[51] Int. Cl.7 .................................................. C08G 18/42
[52] U.S. Cl. .............................. 528/80; 528/75; 528/335; 528/345; 528/347; 525/415
[58] Field of Search ................................ 528/80, 75, 335, 528/345, 347; 525/415

[56] References Cited

U.S. PATENT DOCUMENTS

| | | | |
|---|---|---|---|
| 3,651,021 | 3/1972 | Kincaid et al. | ........................... 525/415 |
| 3,663,515 | 5/1972 | Hostettler et al. . | |
| 3,899,467 | 8/1975 | Bonk et al. . | |
| 4,447,591 | 5/1984 | Watanabe | .................. 528/80 |

FOREIGN PATENT DOCUMENTS

| | | |
|---|---|---|
| 52-69489 | 6/1977 | Japan . |
| 57-185313 | 11/1982 | Japan . |
| 63-196623 | 8/1988 | Japan . |
| 02000628 | 1/1993 | Japan . |
| 6192410 | 7/1994 | Japan . |
| 7292083 | 11/1995 | Japan . |
| 2140436 | 11/1984 | United Kingdom . |

OTHER PUBLICATIONS

C.Seefried, Jr. J.V. Koleske, F.E. Critchfield, Thermoplastic Urethane Elastomers. I. Effect of Soft Segment Variations, Sep. 1975, Journal of Applied Polymer Science vol. 19, No. 9.

C.Seefried, Jr. J.V. Koleske, F.E. Critchfield, Thermoplastic Urethane Elastomers. II. Effects of Variations in Hardsegment Concentration, Sep. 1975, Journal of Applied Polymer Science vol. 19, No. 9.

Nitta Ind Corp., Patent Abstracts of Japan, Dec. 19, 1991, JP 03 220224, vol. 015, No. 504 (C–0896).

*Primary Examiner*—Rachel Gorr
*Attorney, Agent, or Firm*—Huntley & Associates

[57] ABSTRACT

A method for preparing an amorphous polymer chain in an elastomer which permits use of previously unavailable monomers while permitting control of crystallizability of the amorphous polymer chain. The method of the present invention thus permits an increased range of industrial scale production by broadening the range of raw materials which can be used and by increasing the design options in constructing the chain.

21 Claims, 10 Drawing Sheets

METHOD FOR PREPARING AMORPHOUS POLYMER CHAINS IN ELASTOMERS

BACKGROUND OF THE INVENTION

The present invention relates to a method for preparing an amorphous polymer chain in elastomers by a novel technique differing from conventional ones and to a method for preparing an elastomer having excellent mechanical strength as well as rubber elasticity. Generally, elastomers (rubber elastic bodies) are substances which can be obtained by chemically or physically bonding a part of linear polymeric substance (raw rubber: raw material rubber) whose molecules are active in rotational movement at room temperature. Typical elastomers include natural rubber, a part of which is crosslinked with sulfur, peroxides, or the like. A natural rubber derived elastomer is a polymeric compound comprising monomer components arranged with stereoregularity and is amorphous in a normal state but it is highly oriented to behave like a crystallized polymer when excessive deformation is applied thereto and, hence, is an ideal elastomer that has a sufficient resistance to wear and a sufficient strength.

According to the prior art, various elastomers with synthetic amorphous polymer chains have been designed or prepared by processes including the following:

First, there are cited homopolymers such as isoprene rubber (IR), butadiene rubber (BR), and chloroprene rubber (CR). The crystallizability of these polymers depend largely on their micro structures. Here, note that IR is a polymer of isoprene which is a polymerization unit of natural rubbers (NR) and designed to have high properties similar to natural rubbers by selectively increasing cis-1,4- bonds to the level observed in natural rubbers. BR is known to be a polymer whose crystallizability can be controlled by precisely controlling the micro structures such as cis-1,4-, trans-1,4-, -1,2- or -1,3-addition. Also, CR is a crystallizable polymer which comprises mainly a trans-1,4- structure.

Second, there are cited random copolymers such as styrene/butadiene rubber (SBR) and ethylene/propylene rubber (EPR), which are made amorphous by random copolymerization using as one of comonomers a monomer capable of forming a homopolymer having a low glass transition temperature (Tg), for example, butadiene, ethylene, etc.

Third, there are cited alternate copolymers such as tetrafluoroethylene/propylene rubber which are made amorphous by alternate copolymerization to vary the length of the unit structure constituting the polymer.

Fourth, there is cited graft or block copolymers such as block SBR, in which two units, i.e., a rubber component and a resin component, are arranged in the form of a main chain and a graft attached thereto or of blocks linked to each other to thereby render the resulting polymer amorphous.

Fifth, there are cited modified polymers such as chlorosulfonated polyethylene rubber (CSM) and chlorinated polyethylene (CM), in which the corresponding crystallizable homopolymer (e.g., homopolymer of ethylene) having a low Tg is modified to render the resulting polymer noncrystallized or amorphous.

Sixth, there are cited copolymers of a liquid or low crystallizability oligomer having reactive groups on the terminals of the molecule with a chain extender capable of reacting with the terminals. This approach is used typically in the preparation of millable polyurethanes.

As described above, in order to prepare acceptable amorphous polymer chains having vivid molecular motility, it has conventionally been considered necessary to reduce intermolecular force and minimize steric hindrance for the rotation of molecules and, hence, the above described amorphous polymer chains have been designed and prepared. Accordingly, conventional methods for designing amorphous polymer chains include: (1) arranging the double bonds in the polymer chain stereoregularly; (2) randomly or alternately copolymerizing a plurality of monomers having different properties such as structural unit length and showing crystallizability when converted into homopolymer to thereby decrease the crystallizability and render the polymer amorphous; (3) graft or block copolymerizing a plurality of monomers containing at least one monomer to be made amorphous to render the polymer amorphous as a whole; (4) making the polymer amorphous by chemically modifying a homopolymer which shows crystallizability, and; (5) polymerizing an amorphous oligomer.

In addition, there have been known amorphous polymer chains having two or more of the above described features in combination. For example, in the case of CR, in order to cope with the need for continued use at low temperatures, there have been used those polymers having a decreased crystallizability by copolymerization with one or more other monomers (cf. German Patent Publication DE-A-2,235, 811).

Along with recent diversification of industry, a wide variety of elastomers having various functions have been demanded and conventional elastomers have become difficult to cope with such demand. More particularly, there has been awaited development of high performance elastomers having simultaneously those characteristics which have conventionally been considered contradictory to each other. To meet with such needs, the above described conventional approaches have been unsuccessful.

For example, suppose that it is intended to prepare polymer chains having reversal property that they crystallize when stretched while they become amorphous when relaxed. Then, it is necessary to prepare amorphous polymer chains which have structural regularity. However, it has been difficult to perform fine or precise control or adjustment of the polymer arrangement to the extent as desired by the above described conventional methods.

For example, it has been considered that such a high performance elastomer can be prepared using a catalyst such as metallocene or the like with simultaneously controlling stereoregularity, comonomer composition, and molecular weight distribution. However, the monomers which can be used are limited to olefins so that it is difficult to high performance elastomers having desired characteristics.

SUMMARY OF THE INVENTION

Generally, an object of the present invention is to provide a method for preparing an amorphous polymer chain which enables one to manufacture on an industrial scale high performance or high function elastomers that have been difficult to make by conventional methods by a combination of simple processes such as ring opening polymerization, polyaddition, polycondensation and the like.

Specifically, the present invention provides a method for preparing an amorphous polymer chain in an elastomer comprising: forming a crystallizable oligomer having a repeating unit comprising regularly arranged monomer units having first and second ends and reacting said repeating unit at both ends thereof to effect extension of its chain length; selecting the kind of said monomer units to be introduced into said repeating unit; selecting the number of said monomer units in said oligomer; selecting a molecular weight distribution of said repeating unit comprising said monomer units; selecting a linkage unit comprising a compound which reacts with the ends of said repeating units and inhibits crystallization of said repeating unit after the reaction, thereby controlling crystallizability of said polymer chain.

The method of the present invention permits the preparation of elastomers using polymers that have previously not been used because of their high crystallizability, by selecting the number of the monomer units in the oligomer and the molecular weight distribution of the repeating unit in the oligomer.

DETAILED DESCRIPTION OF THE INVENTION

Figure 1:
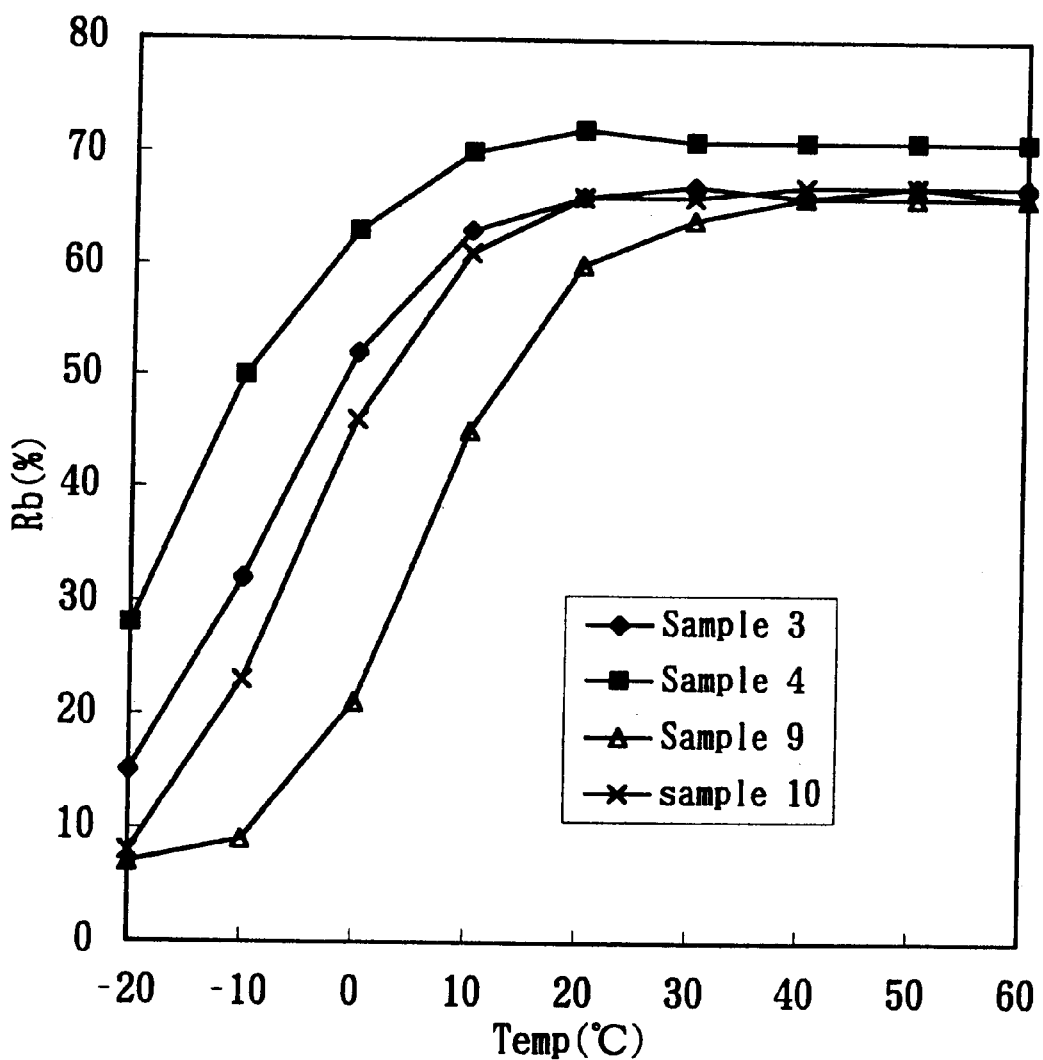
FIG. 1 is a diagram illustrating temperature dependence of ball rebound.
Figure 2:
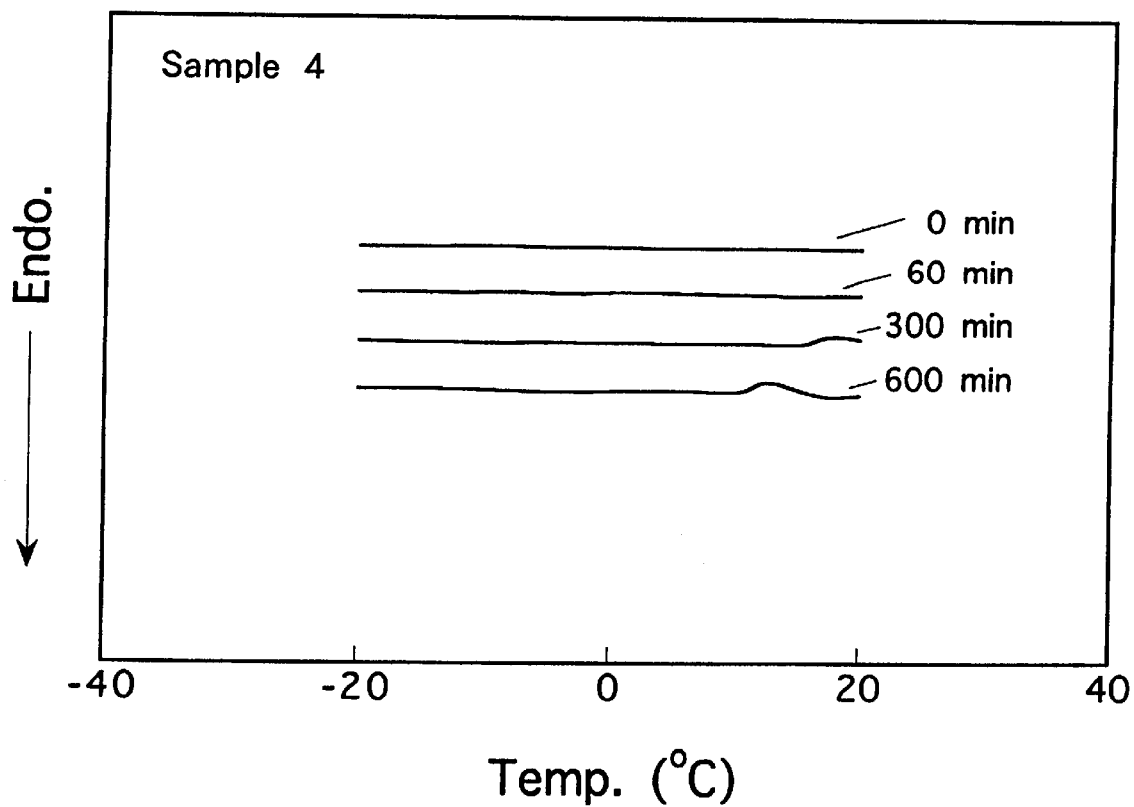
FIG. 2 is a diagram illustrating results of DSC measurement of Sample 4.
Figure 3:
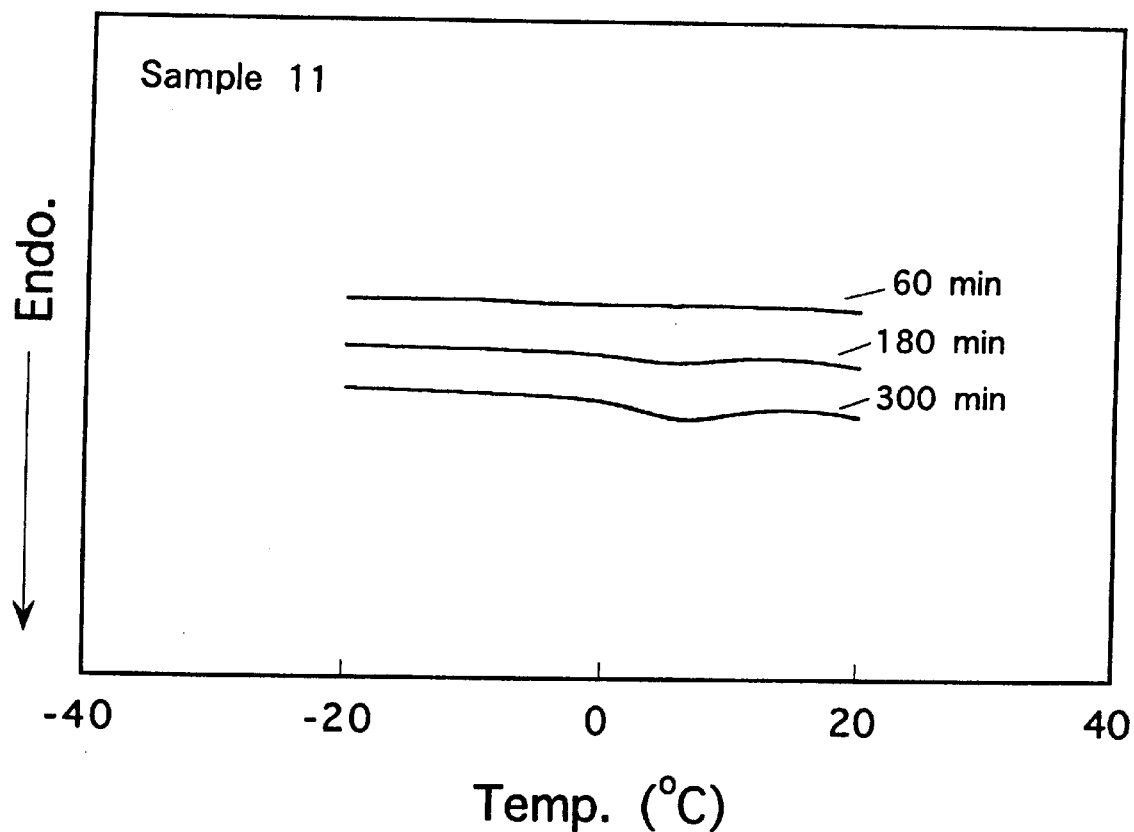
FIG. 3 is a diagram illustrating results of DSC measurement of Comparative Sample 11.
Figure 4:
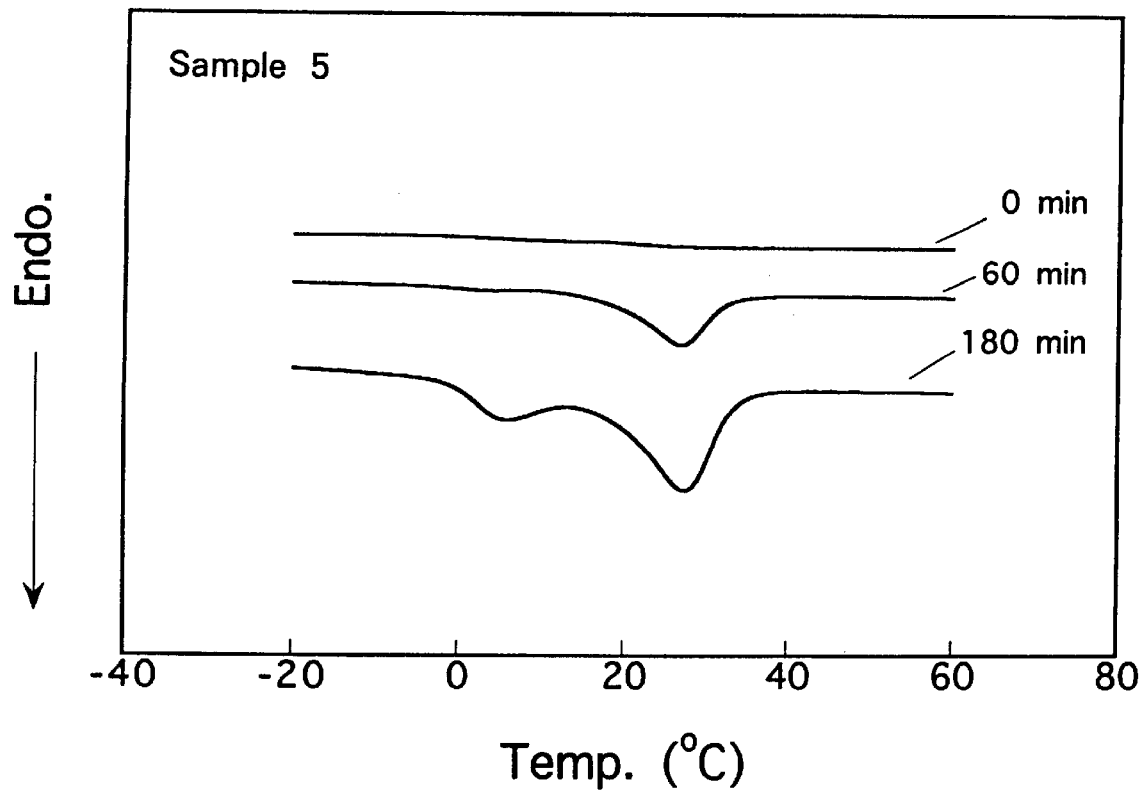
FIG. 4 is a diagram illustrating results of DSC measurement of Sample 5.
Figure 5:
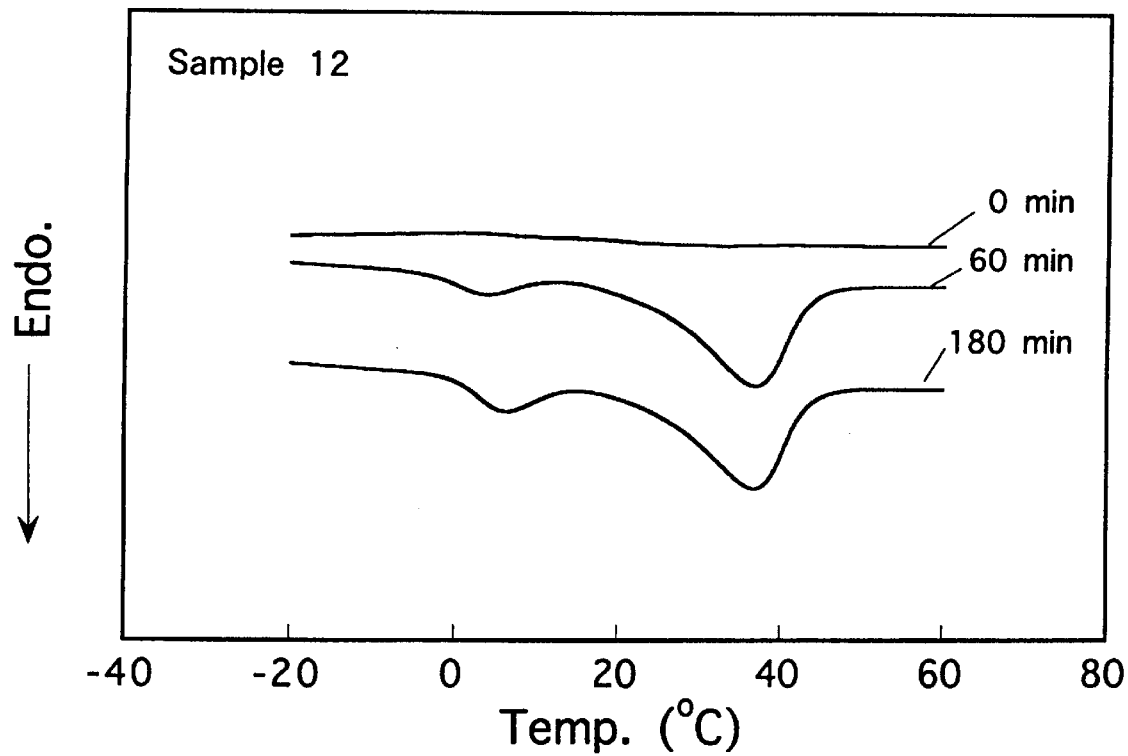
FIG. 5 is a diagram illustrating results of DSC measurement of Comparative Sample 12.

The method of the present invention, in contrast to the conventional design concept of controlling stereoregularity of polymer chains, forms a polymer chain having monomer units and a linkage unit connecting the units and controls the manner of how to combine these or arrangement, the number of repetition of the monomer units, and the molecular weight distribution of the monomer units, thereby making it possible to design amorphous polymer chains having monomer compositions that have conventionally been considered unusable because of their too strong crystallizability. In addition, the preparation method of the present invention can be practiced by using very simple methods such as ring opening polymerization and polyaddition or polycondensation, so that upon industrial scale production, the range in which raw materials for the preparation are selected can be broadened and freedom of design can be increased considerably.

More specifically, appropriate selection of the number of repetition of monomer units and molecular weight distribution of the crystallizable oligomer allows the oligomer portion to be prevented from being crystallized due to an influence by the linkage unit connecting to the oligomer portion. As a result, the monomer compositions that have heretofore been considered unusable because of occurrence of too strong a crystallization can also be used in the present invention. That is, according to the method of the present invention, high melting point oligomers that have hitherto not been introduced into amorphous polymer chains without difficulty can be incorporated thereinto.

Here, the crystallizable oligomer means an oligomer having a melting point, and it is desirable to use high melting oligomers having preferably a melting point of 20° C. or more, more preferably 30° C. or more.

Further, the monomer unit comprises a single monomer or a plurality of monomers and a predetermined number of the monomer unit(s) forms a diol unit. Generally, the diol unit and the end(s) thereof constitutes an oligomer. The oligomer may be a combination of a plurality of the linked monomer units, or diol units, linked at both ends thereof. More specifically, an example of the oligomer is poly-ε-caprolactone polyol represented by general formula (I) below. In this case, the above described $R_1(OH)_2$ is used as the polymerization initiator, and the monomer unit is the ε-caprolactone unit embraced by and m and n indicate the number of ε-caprolactone units.

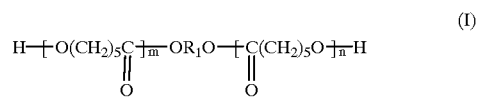

(I)

Furthermore, the linkage unit may be arranged on at least one of the ends of the monomer unit. However, it is preferred that the linkage unit is arranged at both ends of the monomer unit so that the oligomer portion can be prevented from crystallization efficiently. The noncrystalline or amorphous polymer chain thus prepared must have a glass transition temperature of −20° C. or below in order for it to be useful for preparing elastomers. Preferably, the oligomer is a dicarboxylic acid and the compound which reacts with the oligomer is a diamine so that the linkage unit is an amide linkage.

According to the preparation of the present invention, controlling the molecular structure itself of the amorphous polymer chain comprising a crystal portion, results in controlling the crystallizability and amorphousness of the amorphous polymer chain so that it is possible to prepare high performance or high function elastomers which are prevented from crystallization under normal deformation conditions but develops crystallizability or behaves similarly to a crystallized polymer when deformed excessively to increase mechanical strength.

Note that polyurethanes comprising a polycaprolactone based polyol having a narrow molecular weight distribution is disclosed in, for example, Examined Published Japanese Patent Application (Kokoku) No. 39007/1988. This is intended to develop polyurethanes having improved recovery of elasticity. Polyols having narrow molecular weight distributions are disclosed in Examined Published Japanese Patent Application (Kokoku) No. 56251/1991, Unexamined Published Japanese Patent Application (Kokai) No. 292083/1995, and Unexamined Published Japanese Patent Application (Kokai) No. 196623/1988, respectively. They are intended to provide new polyols.

However, to the present inventor's knowledge, there has been no idea that control of, for example, the molecular weight and molecular weight distribution of polyols to be within an appropriate range before they are reacted with diisocyanate, the resulting polyols have a controlled crystallizability.

The present invention is based on the discovery that, in polyols, presence of molecules having a molecular weight more than a predetermined value, results in crystallization as a whole, while increasing the number of molecules having a molecular weight not larger than a predetermined molecular weight results in a lack of a definite glass transition temperature, Tg, of the elastomer. This also depreciates the elastomeric behavior of the final elastomer.

The preparation method of the present invention is achieved by designing the polymer chain such that the molecular weight distribution of the oligomers having crystallizability is controlled to small values and the oligomers are connected to each other through a suitable linkage unit. In order to arrange and connect the oligomer and linkage unit with regularity, it is desirable that the molecular structure be designed so that such structure can be realized by polyaddition or polycondensation.

More specifically, explanation will be made taking an example in which a polyol is used as the oligomer, and a urethane linkage unit is used as the linkage unit. As the polyol, there can be used those which have not been used for the purpose because of having crystallizability, for example, poly-ε-caprolactone based diols. In addition, the system is designed so that when the polyol having a controlled, narrowed molecular weight distribution is reacted with a diisocyanate, the crystallization of the polyol should be prevented by an influence by the polyurethane linkage unit originated from the diisocyanate. For example, when the polyol is to be used which contains as a major component the poly-ε-caprolactone based diol represented by formula (I) above, use of the average number of the caprolactone units in the poly-ε-caprolactone based diol of 3 to 6 and the molecular weight distribution, Mw/Mn, of 1.5 or below for the caprolactone unit of the poly-ε-caprolactone based diol prevents the crystallization of the poly-ε-caprolactone unit. If the average number of the caprolactone units is 7 or more, there appear portions where the crystallization is not prevented by the urethane linkage units. On the other hand, if there are two or less caprolactone units, the glass transition temperature of the polymer chain exceeds −20° C. so that they are unsuitable for use in elastomers.

The poly-ε-caprolactone based diol is prepared by the reaction between the ε-caprolactone monomer and the polymerization initiator. Those represented by formula (I) are prepared using $R_1(OH)_2$ as a polymerization initiator.

The polymerization initiator is not limited particularly and any compounds may be used as far as they have one or more active hydrogen atoms and form one or more diols after ring-open polymerization. Diols and diamines can be used for the purpose. Such an initiator give an influence on the crystallizability of the poly-ε-caprolactone unit as described above. Therefore, in the case where $R_1$ is a straight chain hydrocarbon, for example, the above described average number of the caprolactone unit must be controlled to 3 to 6. For example, when $R_1$ is derived from an initiator having high steric hindrance such as an aromatic ring, an aliphatic ring, etc., and, hence, has a great influence on the crystallizability of the poly-ε-caprolactone unit, the average number of the caprolactone units may be controlled to 4 to 8. That is, in the method of the present invention, the average number of the caprolactone units is controlled to a predetermined number depending on the type of the polymerization initiator.

Examples of the short chain initiators which can be used in the present invention include straight chain glycols having 2 to 12 carbon atoms in the main chain thereof, such as ethylene glycol, 1,3-propylene glycol, and 1,4-butylene glycol; diols having a side chain and having up to 12 carbon atoms, such as neopentyl glycol and 3-methyl-1,5-pentanediol; diols having an unsaturated group and having up to 12 carbon atoms, such as 3-allyloxy-1,2-propanediol; and diols having an aromatic ring and having up to 20 carbon atoms, such as 1,4-bis(hydroxyethoxy)benzene and p-xylene glycol; alicyclic diols such as cyclohexanediol and cyclohexanemethanol; and the like. These short chain initiators may be used singly or two or more of them may be used in combination.

For preparing poly-ε-caprolactone based polyols which are used in the present invention, selection of catalysts as well as ε-caprolactone and polymerization initiator is important. As the catalyst which can control the molecular weight distribution of polyol to narrow ranges, there can preferably be used metal compound catalysts containing halogens or organic acid radicals, for example, tin dihalides such as chloride, bromide, iodide, etc. and the tin based catalyst represented by formula (II) below.

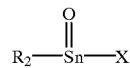

(II)

wherein $R_2$ is a hydrogen atom, an alkyl group, or an aryl group; and X is a hydroxyl group, an alkoxide group or a halogen atom other than fluoride.

In preparing the poly-ε-caprolactone based polyols with a narrow molecular weight distribution, which are used advantageously in the present invention, it is preferred to polymerize the corresponding ε-caprolactone monomers at low temperatures as low as, preferably, 130° C. or below using the tin based catalyst represented by formula (II) above, for example, monobutyltin oxide or tin halides excepting tin fluoride. In this manner, use of monobutyltin oxide or tin halides (excluding fluoride) can give rise to a mono-disperse poly-ε-caprolactones having a molecular weight distribution within the range of 1.0 to 1.3 even at temperatures within the range of 100 to 200° C. without crystallization according as the polymerization reaction proceeds, thus allowing practicing the reaction in the absence of solvents. On the contrary, the technique described in Unexamined Published Japanese Patent Application (Kokai) No. 196623/1988 polymerizes lactone by ring opening polymerization reaction with an inorganic acid catalyst at a temperature of 100° C. or lower instead of 100° C. to 200° C. used in the preceding techniques to give highly mono-dispersed acetone polymers having a molecular weight distribution within the range of 1.0 to 1.2. In the case of bulk polymerization reactions at such low temperatures, crystallization tends to occur according as the polymerization reaction proceeds so that it has been recommended to perform the reaction in the presence of inert organic solvents such as benzene and toluene. However, this requires an additional step of removing or recovering solvents from the reaction mixture after completion of the reaction, which could be a bar to perform the reaction on an industrial scale.

In the present invention, the above described specified poly-ε-caprolactone based diol, which is a long chain polyol, is used as a main component of the polyol and in addition thereto a long chain polyol and chain extenders generally used can be employed in amounts within the range where the object of the present invention is not harmed. As the generally used long chain polyols, there can be used either polyester polyols or polyether polyols, or blends copolymerization products or partially modified products therefrom. Examples of the chain extenders include straight chain glycols having 2 to 12 carbon atoms in the main chain, such as ethylene glycol, thiodiethanol, propylene glycol, and butylene glycol; diols having an aromatic ring and having up to 20 carbon atoms, such as 1,4-bis(hydroxyethoxy)benzene and p-xylene glycol and hydrogenated products thereof. Additionally, triols such as trimethylol; or stearyl alcohol, hydroxyethyl acrylate and the like can also be used.

In the case where the polyurethane obtained by the method of the present invention is crosslinked with sulfur, a compound having an unsaturated bond is used as a part of the polymerization initiator or chain extender in accordance with conventional manner.

Such a diol can be reacted with a suitable diisocyanate to form an amorphous polymer chain. Preferred diisocyantes include at least one member selected from the group consisting of 2,6-toluene diisocyanate (TDI), 4,4'diphenylmethane diisocyanate (MDI), p-phenylene diisocyante (PPDI), 1,5-napthalene diisocyanate (NDI), and 3,3-dimethyldiphenyl-4,4'-diisocyanate (TODI). Such an amorphous polymer chain can be converted to a millable polyurethane. The amorphous polymer chain can be converted to a millable polyurethane by crosslinking the amorphous polymer chain, as it is or after introduction of suitable crosslinking sites therein, with sulfur, peroxides, metal salts, and the like.

In this case, the polyurethane is adjusted such that its crystallization is prevented under normal deformation conditions whereas under excessive deformation, it develops crystallizability. Accordingly, the millable polyurethane thus obtained has excellent mechanical strength and wear resistance.

As described above, the preparation method of the present invention, as compared with the conventional design, makes it possible to use a wide variety of raw materials and, hence, has flexibility in use or general purpose properties. The present invention makes it possible to design the polymer chain using even those oligomers that have conventionally been paid no attention because of excessive crystallizability for designing elastomers, thus enhancing freedom in design considerably.

Further, according to the preparation method of the present invention, the above-described oligomer portion have two phases which changes one from another reversibly, i.e., an elastic state or phase where the oligomer shows rubber elasticity under normal use conditions because the oligomer has a limited crystallizability and an orientation crystallization state or phase where the oligomer develops crystallizability due to excessive deformation. Therefore, according to the present invention, the crystallizability of the polymer chain can be adjusted precisely. One of the factors for such a precise adjustment of the crystallizability is, for example, the above-described selection of $R_1$ for polymerization initiator. In the selection of $R_1$ in the polymerization initiator, for reversible development of crystallizability, it is desirable to use straight chain glycols having 2 to 6 carbon atoms, but contains no alkyl side chains such as a methyl group. Particularly, among the cyclic compounds, those having attached to the 1,4-positions thereof the linkage unit to the lactone directly or indirectly shows ideal reversibility. Example of such a compound include p-xylene glycol, 1,4-bis(hydroxyethoxy)benzene (BHEB), and the like.

The amorphous polymer chains designed by the method of the present invention can be converted to an elastomer by crosslinking them as they are or after introduction therein of suitable crosslinking sites with sulfur, peroxides, metal salts, and the like.

The amorphous polymer chains designed by the method of the present invention can be used as a soft segment for preparing a thermoplastic elastomer as well as for use as raw rubber as described above, and further as a soft segment for preparing castable or thermoplastic polyurethane elastomers. Thermoplastic polyurethane elastomers can be prepared with such a soft segment and a hard segment.

EXAMPLES

Hereafter, the present invention will be described in greater detail by an example which explains how to produce the amorphous polymer chain in a millable polyurethane elastomer.

First, as the monomer unit for the repeating unit which constitutes the amorphous polymer chain of a polyurethane elastomer, there was selected ε-caprolactone used as a starting compound for preparing a castable high strength polyurethane. This caprolactone, upon ring opening polymerization reaction with $R_1(OH)_2$, a polymerization initiator, and a catalyst, formed a crystallizable oligomer having an ε-caprolactone unit and a hydroxyl group on each end thereof. In this amorphous polymer chain, the crystallizability of the repeating unit comprising ε-caprolactone is inhibited by polyurethane linkage unit derived from a diisocyanate and $R_1$ derived from the polymerization initiator.

Therefore, physical properties of various millable polyurethanes were investigated in accordance with the following procedures.

Investigation for the Selection of the Number of Monomer units

To begin with, ethylene glycol was selected as a polymerization initiator, and a poly-ε-caprolactone based diol was produced by setting the molecular distributions to about 1.4 and about 2.2, respectively, the average number of monomer units to values varying within the range of 2.5 to 8.5.

Here, the group of Samples 1 to 7 (hereafter, referred to as Group A) had a molecular weight distribution as narrow as about 1.4 while the group of Samples 8 to 14 (hereafter, referred to as Group B) had a molecular weight distribution of about 2.2, which value was, within the range usually used in the conventional techniques. Table 1 shows the amount of catalyst and reaction temperature used in each reaction, the designed and calculated values of the number of ε-caprolactone units, designed and measured values of average molecular weight, and molecular weight distribution (Mw/Mn).

Here, the average molecular weights were determined by measuring the hydroxyl number of polyols according to JIS K1557-6.4 and calculating by the following equation: Molecular Weight=56.1×N×1000/Hydroxyl Number where N is the number of functional groups in the polymerization initiator.

Further, the molecular weight distribution was determined by gel chromatography (GPC) under the following conditions:

| Apparatus: | LC-3A, SHIMAZU SEISAKUSHO; |
|---|---|
| Solvent: | Tetrahydrofuran (1 ml/min.) |
| Temperature: | 50° C. |
| Column: | Shodex KF801 1 tube |
| | KF8025 1 tube |
| | KF804 1 tube |
| Detector: | RID-6A, SHIMAZU SEISAKUSHO |

TABLE 1

| | Sample | Ini. K. | ε-CL P. | CAT P. | K. | R.Temp (ppm) | NCl ° C. | AMW Dd. | AMW Dd. | NCl Md. | Mw/Mn Cd. |
|---|---|---|---|---|---|---|---|---|---|---|---|
| A | 1 | EG | 62 | 570 | SnCl$_2$ | 5 | 150 | 2.5 | 632 | 616 | 2.4 | 1.4 |
| | 2 | EG | 62 | 684 | SnCl$_2$ | 5 | 150 | 3 | 746 | 810 | 3.3 | 1.4 |
| | 3 | EG | 62 | 912 | SnCl$_2$ | 5 | 150 | 4 | 974 | 999 | 4.1 | 1.3 |

TABLE 1-continued

|   | Sample | Ini. K. | ε-CL P. | CAT P. | K. | (ppm) | R.Temp °C. | NCl Dd. | AMW Dd. | AMW Md. | NCl Cd. | Mw/Mn |
|---|---|---|---|---|---|---|---|---|---|---|---|---|
|   | 4  | EG | 62 | 1140 | SnCl₂ | 5  | 150 | 5   | 1202 | 1163 | 4.8 | 1.4 |
|   | 5  | EG | 62 | 1368 | SnCl₂ | 5  | 150 | 6   | 1430 | 1480 | 6.2 | 1.3 |
|   | 6  | EG | 62 | 1596 | SnCl₂ | 5  | 150 | 7   | 1658 | 1647 | 7.0 | 1.4 |
|   | 7  | EG | 62 | 1938 | SnCl₂ | 5  | 150 | 8.5 | 2000 | 1991 | 8.5 | 1.4 |
| B | 8  | EG | 62 | 570  | TBT   | 10 | 170 | 2.5 | 632  | 641  | 2.5 | 2.3 |
|   | 9  | EG | 62 | 684  | TBT   | 10 | 170 | 3   | 746  | 792  | 3.2 | 2.2 |
|   | 10 | EG | 62 | 912  | TBT   | 10 | 170 | 4   | 974  | 974  | 4.0 | 2.1 |
|   | 11 | EG | 62 | 1140 | TBT   | 10 | 170 | 5   | 1202 | 1184 | 4.9 | 2.3 |
|   | 12 | EG | 62 | 1368 | TBT   | 10 | 170 | 6   | 1430 | 1460 | 6.1 | 2.1 |
|   | 13 | EG | 62 | 1596 | TBT   | 10 | 170 | 7   | 1658 | 1699 | 7.2 | 2.2 |
|   | 14 | EG | 62 | 1938 | TBT   | 10 | 170 | 8.5 | 2000 | 1991 | 8.5 | 2.3 |

Ini.: Initiator, K.; Kinds, P.: Parts,
ε-CL; ε-caprolactone, P.: Parts
CAT: Catalyst, K.: Kinds
R.Temp: Room Temperature
NCl(Dd.):Designed values of the number of ε-caprolactone units,
AMW(Dd.):Designed values of average molecular weight
AMW(Md.):Measured values of average molecular weight
NCl(Cd.):Calculated values of the number of ε-caprolactone units Each of the poly-ε-caprolactone based polyols and equimolar amount of 4,4'-diphenylmethane diisocyanate (MDI) were reacted at 100° C. for 5 hours to obtain various millable polyurethanes.

In order to evaluate the properties of the millable polyurethanes thus obtained as an amorphous polymer chain their glass transition temperature, Tg, and the stability during storage at low temperatures was examined. The stability during storage at low temperatures was judged from their flexibility after standing at temperatures of −15° C., 5° C. and 25° C. for 3 days. Table 2 shows the results obtained.

As a result, it was found that in both group A having a narrower molecular weight distribution and group B having a broader molecular weight distribution, the crystallizability of the polyurethanes increased with an increased average number of e-caprolactone units. Group A had a wider temperature range than group B at which the amorphous state can be maintained.

TABLE 2

|   | Sample | Ini. K. | NCl (Dd.) | Mw/Mn | Tg °C. | Properties of GUM (Prop. after 3 days) −15° C. | 5° C. | 25° C. |
|---|---|---|---|---|---|---|---|---|
| A | 1  | EG | 2.4 | 1.4 | −10 | Am  | Am  | Am  |
|   | 2  | EG | 3.3 | 1.4 | −24 | Am  | Am  | Am  |
|   | 3  | EG | 4.1 | 1.3 | −33 | Am  | Am  | Am  |
|   | 4  | EG | 4.8 | 1.4 | −37 | Cry | Am  | Am  |
|   | 5  | EG | 6.2 | 1.3 | −41 | Cry | Cry | Am  |
|   | 6  | EG | 7.0 | 1.4 | −45 | Cry | Cry | Cry |
|   | 7  | EG | 8.5 | 1.4 | −48 | Cry | Cry | Cry |
| B | 8  | EG | 2.5 | 2.3 | −12 | Am  | Am  | Am  |
|   | 9  | EG | 3.2 | 2.2 | −24 | Am  | Am  | Am  |
|   | 10 | EG | 4.0 | 2.1 | −34 | Cry | Am  | Am  |
|   | 11 | EG | 4.9 | 2.3 | −38 | Cry | Cry | Am  |
|   | 12 | EG | 6.1 | 2.1 | −42 | Cry | Cry | Cry |
|   | 13 | EG | 7.2 | 2.2 | −46 | Cry | Cry | Cry |
|   | 14 | EG | 8.5 | 2.3 | −48 | Cry | Cry | Cry |

Ini.: Initiator, K.: Kinds, P.: Parts,
Tg: Glass transition temperature
NCl(Dd.): Designed values of the number of ε-caprolactone units,
Properties of GUM: Properties of polyurethane
Prop. After 3 days: Properties after standing at each temp. for 3 days
Am: Amorphous
Cry: Crystallization Further, to 100 parts by weight of each of the millable polyurethanes produced as described above was added 1.5 parts by weight of dicumyl peroxide (NIPPON FATS & OIL; PERCUMYL D (trade name)) and the mixture was kneaded in an open roll and press-molded at 160° C. for 20 minutes to obtain various crosslinked elastomers. These crosslinked elastomers were measured for hardness (Hs: JIS A scale) according to JIS K6253, ball rebound (Rb: %) according to JIS K6255 (based on ISO 4662), tensile strength (Tb: MPa) and elongation (Eb: %) according to JIS K6251 (based on ISO 37), tear strength using a notched, an angled test piece (Tr: N/mm) according to JIS K6252 (based on ISO 34). Table 3 shows the results obtained. Here, the crosslinked elastomers were measured for initial hardness after heating at 60° C. for 30 minutes and standing at 23° C. for 3 hours. Further, the crosslinked elastomers were also measured for hardness after standing at various temperatures for 3 days. Table 3 also shows the results of these tests. Furthermore, Samples 3, 4, 9, and 10 were measured for temperature dependence of ball rebound at −20° C. to 60° C. FIG. 1 illustrates the results.

Each crosslinked elastomer was observed for the phenomenon of "cold hardening", i.e., an increase in hardness from the hardness after standing at various temperature for 3 days due to crystallization. Then, the elastomers produced using poly-ε-caprolactone having a molecular weight of 1,500 (average number of caprolactone units of 6) suitable for use in conventional castable elastomers showed an increase in hardness even at temperatures near normal temperature. In those elastomers that were produced using poly-ε-caprolactone units of 3 or less showed no crystallizability but temperature dependence of the physical properties of the elastomer increases unacceptably at around normal temperature so that the resulting elastomer is unsuitable. On the other hand, use of poly-ε-caprolactone gave rise to elastomers which are less dependent on temperature without increasing the hardness.

These facts suggest that an increase in hardness due to crystallization is considered to depend on the number of lactone monomer units and on the contrary, the number of monomer units exceeds a predetermined value, the crystallizability of the polymer increases too high for the polymer to be suitable as an amorphous polymer chain in elastomers. When the average number of monomer units is below a predetermined value (e.g., below 3), the concentration of urethane group in the amorphous polymer chain increases so that the glass transition temperature of the polymer chain increases and gives an adverse influence on the temperature dependence. Therefore, in order for the elastomers to have low glass transition temperatures sufficient for practical purposes (e.g., −20° C. or below) while prevented from crystallizing, it is useful to highly control the molecular weight distribution of ε-caprolactone. Further, based on the knowledge that what is crystallized is the poly-ε-caprolactone unit, it is considered possible to finely control the crystallizability of the poly-ε-lactone unit, which was impossible by the conventional techniques, by selectively arranging molecules that control the crystallization of the linkage unit at both ends thereof.

consisting of samples 20 to 24 corresponded to poly-ε-caprolactones having an average number ε-caprolactone of 5 and various molecular weight distributions ranging from 1.18 to 2.21.

Table 4 shows the amount of catalyst and reaction time used in each reaction, the designed and calculated values of the number of ε-caprolactone units, designed and found values of average molecular weight, and molecular weight distribution (Mw/Mn).

TABLE 3

Property of Elastomers

| | Sample | Hs | Rb | Tb | Eb | Tr | Hs (after 3 days) | | | |
|---|---|---|---|---|---|---|---|---|---|---|
| | | | | | | | −20° C. | 0° C. | 10° C. | 20° C. |
| A | 1 | 53 | 48 | 12.8 | 560 | 23.7 | 95 | 55 | 52 | 50 |
| | 2 | 53 | 60 | 18.5 | 520 | 25.8 | 54 | 54 | 53 | 53 |
| | 3 | 53 | 66 | 19.2 | 520 | 23.7 | 52 | 53 | 53 | 53 |
| | 4 | 52 | 72 | 17.4 | 510 | 28.6 | 65 | 54 | 54 | 53 |
| | 5 | 53 | 69 | 18.5 | 510 | 38.5 | 85 | 92 | 92 | 52 |
| | 6 | 54 | 71 | 24.1 | 520 | 49.8 | 94 | 93 | 93 | 85 |
| | 7 | 55 | 73 | 24.8 | 520 | 57.7 | 94 | 93 | 93 | 87 |
| B | 8 | 54 | 52 | 15.3 | 540 | 25.1 | 90 | 55 | 54 | 53 |
| | 9 | 49 | 60 | 18.8 | 520 | 23.6 | 55 | 54 | 49 | 49 |
| | 10 | 48 | 66 | 20.2 | 510 | 31.5 | 85 | 87 | 52 | 47 |
| | 11 | 53 | 72 | 19.3 | 540 | 28.3 | 85 | 89 | 88 | 53 |
| | 12 | 54 | 74 | 23.1 | 510 | 41.7 | 91 | 93 | 93 | 79 |
| | 13 | 92 | 65 | 24.2 | 520 | 44.2 | 95 | 95 | 94 | 94 |
| | 14 | 93 | 65 | 23.8 | 550 | 57.7 | 96 | 95 | 94 | 94 |

Hs (after 3 days): Hardness after standing at various temperature for 3 days

Investigation for the Selection of Molecular Weight Distribution

As shown in Table 5, investigation was made of the influence on crystallizability of changes in the molecular

TABLE 4

| | | Ini. | | ε-CL | CAT | | R.Temp | NCl | AMW | AMW | NCl | |
|---|---|---|---|---|---|---|---|---|---|---|---|---|
| | Sample | K. | P. | P. | K. | (ppm) | ° C. | Dd. | Dd. | Md. | Cd. | Mw/Mn |
| C | 15 | EG | 62 | 1368 | TBT | 10 | 170 | 6 | 1430 | 1457 | 6.1 | 2.13 |
| | 16 | EG | 62 | 1368 | SnCl$_2$ | 5 | 170 | 6 | 1430 | 1414 | 5.9 | 1.86 |
| | 17 | EG | 62 | 1368 | SnCl$_2$ | 5 | 150 | 6 | 1430 | 1407 | 5.9 | 1.45 |
| | 18 | EG | 62 | 1368 | MBTO | 50 | 150 | 6 | 1430 | 1478 | 6.2 | 1.29 |
| | 19 | EG | 62 | 1368 | MBTO | 50 | 120 | 6 | 1430 | 1451 | 6.1 | 1.15 |
| D | 20 | EG | 62 | 1140 | TBT | 10 | 170 | 5 | 1202 | 1211 | 5.0 | 2.21 |
| | 21 | EG | 62 | 1140 | SnCl$_2$ | 5 | 170 | 5 | 1202 | 1238 | 5.2 | 1.83 |
| | 22 | EG | 62 | 1140 | SnCl$_2$ | 5 | 150 | 5 | 1202 | 1216 | 5.1 | 1.41 |
| | 23 | EG | 62 | 1140 | MBTO | 50 | 150 | 5 | 1202 | 1254 | 5.2 | 1.28 |
| | 24 | EG | 62 | 1140 | MBTO | 50 | 120 | 5 | 1202 | 1170 | 4.9 | 1.18 |

Ini.: Initiator, K.; Kinds, P.: Parts,
ε-CL; ε-caprolactone, P.: Parts
CAT: Catalyst, K.: Kinds
R.Temp: Room Temperature
NCl(Dd.):Designed values of the number of ε-caprolactone units,
AMW(Dd.):Designed values of average molecular weight
AMW(Md.):Measured values of average molecular weight
NCl(Cd.):Calculated values of the number of ε-caprolactone units weight distribution of caprolactone unit at a fixed number of caprolactone units.

Here, group C consisting of Samples 15 to 19 corresponded to poly-ε-caprolactones having an average number of ε-caprolactone unit of 6 and various molecular weight distributions ranging from 1.15 to 2.13 while group D Next, each of the poly-ε-caprolactone based polyols and equimolar amount of 4,4'-diphenylmethane diisocyanate (MDI) were reacted at 100° C. for 5 hours to obtain various millable polyurethanes.

These millable polyurethanes were evaluated for their stability as an amorphous polymer chain in terms of changes in physical properties upon storage at low temperatures, i.e., by storing them at low temperatures and measuring their glass transition temperature, Tg, and visually observing their crystallizability at temperatures of −25° C. 5° C. and 25° C. Table 5 shows the results obtained.

TABLE 5

|   | Sample | Ini. K. | NCl (Cd.) | Mw/Mn | Tg °C. | Properties of GUM (Prop. after 3 days) | | |
|---|---|---|---|---|---|---|---|---|
|   |   |   |   |   |   | −15° C. | 5° C. | 25° C. |
| C | 15 | EG | 6.1 | 2.13 | −42 | Cry | Cry | Cry |
|   | 16 | EG | 5.9 | 1.86 | −42 | Cry | Cry | Cry |
|   | 17 | EG | 5.9 | 1.45 | −41 | Cry | Cry | Am |
|   | 18 | EG | 6.2 | 1.29 | −41 | Cry | Cry | Am |
|   | 19 | EG | 6.1 | 1.15 | −41 | Cry | Cry | Am |
| D | 20 | EG | 5.0 | 2.21 | −38 | Cry | Cry | Am |
|   | 21 | EG | 5.2 | 1.83 | −39 | Cry | Cry | Am |
|   | 22 | EG | 5.1 | 1.41 | −37 | Cry | Am | Am |

TABLE 5-continued

| Sample | Ini. K. | NCl (Cd.) | Mw/Mn | Tg °C. | Properties of GUM (Prop. after 3 days) | | |
|---|---|---|---|---|---|---|---|
|   |   |   |   |   | −15° C. | 5° C. | 25° C. |
| 23 | EG | 5.2 | 1.28 | −37 | Am | Am | Am |
| 24 | EG | 4.9 | 1.18 | −37 | Am | Am | Am |

Ini.: Initiator, K.: Kinds, P.: Parts,
Tg: Glass transition temperature
NCl(Dd.): Designed values of the number of ε-caprolactone units,
Properties of GUM: Properties of polyurethane
Prop. After 3 days: Properties after standing at each temp. for 3 days
Am: Amorphous
Cry: Crystallization Further, various crosslinked polyurethanes were obtained using each of the millable polyurethane in the same manner as described above. The crosslinked polyurethanes were tested for their physical properties as described above. Table 6 shows the results.

The change in hardness of the crosslinked polyurethanes indicated the molecular weight distribution of poly-ε-caprolactone based diol, raw material, gave a considerable influence on the increase in hardness due to crystallization at low temperatures (cold hardening) of elastomers and use of polyols having a very narrow molecular weight distribution made it possible to provide millable elastomers having controlled low temperature crystallizability. The present invention attained maximal effects by the use of polyols similar to mono-dispersed polyols as having a molecular weight distribution of 1.5 or less, preferably 1.3 or less, which indicates distribution of caprolactone units. In other words, because the average number of units can be made greater under the conditions where the crystallizability is controlled or limited, it is possible to obtain a glass transition temperature sufficient for practical use as a rubber elastic body so that amorphous elastomers comprising highly crystallizable units that have been contradictory in the prior art can be produced using general purpose production facilities used in rubber industry. The "glass transition sufficient for practical use" may be defined, for example, as about −20° C. This is because at a glass transition temperature of −20° C. or higher, the rubber elasticity exhibited at normal temperature cannot be maintained at those low temperatures which are encountered ordinarily, such as 0° C.

TABLE 6

| | | | Property of Elastomers | | | | | | |
|---|---|---|---|---|---|---|---|---|---|
| | | | | | | | Hs (after 3 days) | | |
| | Sample | Hs | Rb | Tb | Eb | Tr | −20° C. | 0° C. | 10° C. | 20° C. |
| C | 15 | 54 | 74 | 23.1 | 510 | 41.7 | 91 | 93 | 93 | 79 |
|   | 16 | 55 | 70 | 21.5 | 520 | 39.8 | 92 | 94 | 94 | 85 |
|   | 17 | 53 | 71 | 18.5 | 510 | 38.5 | 85 | 92 | 92 | 52 |
|   | 18 | 53 | 72 | 17.6 | 500 | 38.5 | 85 | 92 | 88 | 52 |
|   | 19 | 52 | 72 | 18.5 | 520 | 36.1 | 88 | 90 | 89 | 53 |
| D | 20 | 53 | 72 | 19.3 | 540 | 28.3 | 85 | 89 | 88 | 53 |
|   | 21 | 55 | 71 | 16.5 | 490 | 25.3 | 87 | 90 | 86 | 55 |
|   | 22 | 52 | 72 | 17.4 | 510 | 28.6 | 65 | 54 | 54 | 53 |
|   | 23 | 54 | 70 | 18.1 | 520 | 30.2 | 54 | 53 | 53 | 54 |
|   | 24 | 54 | 70 | 17.4 | 510 | 28.8 | 53 | 54 | 53 | 53 |

Hs (after 3 days): Hardness after standing at various temperature for 3 days

Investigation for the Selection of the Kind of Polymerization Initiator

In this example, ε-caprolactone was selected as a monomer and the ε-caprolactone and a polymerization initiator were reacted by ring opening polymerization and, hence, the kind of polymerization initiator gave an important influence on the crystallizability of the resulting amorphous polymer chain. Therefore, as shown in Table 7, there were used as a polymerization initiator 1,4-butanediol (1,4-BD), 1,5-pentanediol (1,5-PD), 1,6-hexanediol (1, 6-HD), nonanediol (NP), neopentyl glycol (NPG), 3-methyl-1,5-pentanediol (3MPG), cyclohexanedimethanol (CHDM), p-xylene glycol (PXG), 1,4bis-(hydroxyethoxy)benzene (BHEB), and BPE-20 (SANYO KASEI KOGYO CO., LTD., trade name: an adduct of bisphenol A with 1 mole of ethylene oxide added to each end thereof) and these were reacted with ε-caprolactone under predetermined conditions to produce poly-ε-caprolactone based diols of samples 11 to 53. For each run, the reaction was proceeded under nitrogen flow until the remaining caprolactone monomer was reduced to 1% or less as measured by gas chromatography.

Table 7 shows the amount of catalyst and reaction temperature used in each reaction, the designed and calculated values of the number of ε-caprolactone units, designed and found values of average molecular weight, and molecular weight distribution (Mw/Mn).

TABLE 7

| Sample | Ini. K. | Ini. P. | ε-CL P. | CAT K. | CAT ppm | R.Temp °C. | AMW Dd. | AMW Md. | NCl Cd. | Mw/Mn |
|---|---|---|---|---|---|---|---|---|---|---|
| 25 | 1,4-BD | 87 | 913 | MBTO | 50 | 120 | 1000 | 1017 | 4.1 | 1.24 |
| 26 | 1,4-BD | 90 | 979 | MBTO | 50 | 120 | 1069 | 1070 | 4.3 | 1.20 |
| 27 | 1,4-BD | 90 | 1140 | MBTO | 50 | 120 | 1230 | 1206 | 4.9 | 1.15 |
| 28 | 1,4-BD | 90 | 1360 | MBTO | 50 | 120 | 1450 | 1424 | 5.9 | 1.18 |
| 29 | 1,4-BD | 90 | 1596 | MBTO | 50 | 120 | 1686 | 1645 | 6.8 | 1.17 |
| 30 | 1,5-PD | 104 | 916 | MTBO | 50 | 120 | 1020 | 1020 | 4.0 | 1.18 |
| 31 | 1,5-PD | 104 | 1026 | MTBO | 50 | 120 | 1130 | 1107 | 4.4 | 1.18 |
| 32 | 1,5-PD | 104 | 1140 | MTBO | 50 | 120 | 1244 | 1228 | 4.9 | 1.15 |
| 33 | 1,5-PD | 104 | 1368 | MTBO | 50 | 120 | 1472 | 1446 | 5.9 | 1.14 |
| 34 | 1,5-PD | 104 | 1596 | MTBO | 50 | 120 | 1700 | 1667 | 6.9 | 1.19 |
| 35 | 1,6-HD | 118 | 798 | MTBO | 50 | 120 | 916 | 923 | 3.5 | 1.20 |
| 36 | 1,6-HD | 118 | 902 | MTBO | 50 | 120 | 1020 | 1009 | 3.9 | 1.18 |
| 37 | 1,6-HD | 118 | 1140 | MTBO | 50 | 120 | 1258 | 1243 | 4.9 | 1.17 |
| 38 | ND | 160 | 860 | MTBO | 50 | 120 | 1020 | 1012 | 3.7 | 1.16 |
| 39 | ND | 160 | 1140 | MTBO | 50 | 120 | 1300 | 1272 | 4.9 | 1.15 |
| 40 | NPG | 104 | 912 | MTBO | 50 | 120 | 1016 | 1021 | 4.0 | 1.27 |
| 41 | NPG | 104 | 1026 | MTBO | 50 | 120 | 1130 | 1143 | 4.6 | 1.31 |
| 42 | NPG | 104 | 1140 | MTBO | 50 | 120 | 1244 | 1240 | 5.0 | 1.35 |
| 43 | NPG | 104 | 1472 | MTBO | 50 | 120 | 1472 | 1476 | 6.0 | 1.23 |
| 44 | NPG | 104 | 1596 | MTBO | 50 | 120 | 1700 | 1697 | 7.0 | 1.23 |
| 45 | 3-MPD | 118 | 882 | MTBO | 50 | 120 | 1000 | 1001 | 3.9 | 1.24 |
| 46 | 3-MPD | 118 | 1026 | MTBO | 50 | 120 | 1144 | 1152 | 4.5 | 1.15 |
| 47 | 3-MPD | 118 | 1140 | MTBO | 50 | 120 | 1258 | 1271 | 5.1 | 1.33 |
| 48 | 3-MPD | 118 | 1368 | MTBO | 50 | 120 | 1486 | 1413 | 5.7 | 1.18 |
| 49 | 3-MPD | 118 | 1596 | MTBO | 50 | 120 | 1714 | 1708 | 7.0 | 1.26 |
| 50 | CHDM | 144 | 876 | MBTO | 50 | 120 | 1020 | 1021 | 3.8 | 1.18 |
| 51 | CHDM | 144 | 1140 | MBTO | 50 | 120 | 1284 | 1264 | 4.9 | 1.15 |
| 52 | CHDM | 144 | 1368 | MBTO | 50 | 120 | 1512 | 1476 | 5.8 | 1.16 |
| 53 | CHDM | 144 | 1482 | MBTO | 50 | 120 | 1626 | 1587 | 6.3 | 1.14 |
| 54 | CHDM | 144 | 1710 | MBTO | 50 | 120 | 1854 | 1801 | 7.3 | 1.15 |
| 55 | PXG | 138 | 882 | MTBO | 50 | 120 | 1020 | 1025 | 3.9 | 1.26 |
| 56 | PXG | 138 | 1140 | MTBO | 50 | 140 | 1278 | 1323 | 5.2 | 1.21 |
| 57 | PXG | 138 | 1368 | MTBO | 50 | 140 | 1506 | 1556 | 6.2 | 1.26 |
| 58 | PXG | 138 | 1596 | MTBO | 50 | 120 | 1734 | 1784 | 7.2 | 1.14 |
| 59 | PXG | 138 | 1824 | MTBO | 50 | 120 | 1962 | 2014 | 8.2 | 1.15 |
| 60 | BHEB | 198 | 1140 | MTBO | 50 | 120 | 1338 | 1320 | 4.9 | 1.15 |
| 61 | BHEB | 198 | 1368 | MTBO | 50 | 120 | 1566 | 1554 | 5.9 | 1.16 |
| 62 | BHEB | 198 | 1596 | MTBO | 50 | 120 | 1794 | 1784 | 7.0 | 1.14 |
| 63 | BHEB | 198 | 1824 | MTBO | 50 | 120 | 2022 | 2011 | 8.0 | 1.14 |
| 64 | BPE-20 | 316 | 1140 | MTBO | 50 | 120 | 1456 | 1418 | 4.8 | 1.19 |
| 65 | BPE-20 | 316 | 1368 | MTBO | 50 | 120 | 1684 | 1662 | 5.9 | 1.19 |
| 66 | BPE-20 | 316 | 1596 | MTBO | 50 | 120 | 1912 | 1861 | 6.8 | 1.18 |
| 67 | BPE-20 | 316 | 1824 | MTBO | 50 | 120 | 2140 | 2093 | 7.8 | 1.18 |

Ini.: Initiator, K.: Kinds, P.: Parts,
ε-CL: ε-caprolactone, P.: Parts
CAT: Catalyst, K.: Kinds
R.Temp: Room Temperature
NCl(Dd.):Designed values of the number of ε-caprolactone units,
AMW(Dd.):Designed values of average molecular weight
AMW(Md.):Measured values of average molecular weight
NCl(Cd.):Calculated values of the number of ε-caprolactone units
MBTO: Monobutyl tin oxide
TBT: Tetrabutyl titanate Each of the poly-ε-caprolactone based polyols and equimolar amount of 4,4'-diphenylmethane diisocyanate (MDI) were reacted at 100° C. for 5 hours to obtain various millable polyurethanes.

These millable polyurethanes were evaluated for their stability as an amorphous polymer chain in terms of changes in physical properties upon storage at low temperatures, i.e., by storing them at low temperatures and measuring their glass transition temperature, Tg, and relative crystallizability at −10° C. to obtain the results shown in Table 8. Here, the relative crystallizability was obtained by measuring heat of fusion of a sample using differential scanning calorimeter (DSC) after holding the sample at −10° C. for 10 hours and comparing the data with those of natural rubber, followed by rating them based on the following classes: weak (W), medium (M) and strong (S).

TABLE 8

| Sample | CAT K. | NCl (Cd.) | Mw/Mn | Tg °C. | R. Cry. −10° C. |
|---|---|---|---|---|---|
| 25 | 1,4-BD | 4.1 | 1.24 | −35.8 | W |
| 26 | 1,4-BD | 4.3 | 1.20 | −36.5 | W |
| 27 | 1,4-BD | 4.9 | 1.15 | −40.5 | M |
| 26 | 1,4-BD | 5.9 | 1.18 | −45.3 | M-S |
| 29 | 1,4-BD | 6.8 | 1.17 | −48 | S |
| 30 | 1,5-PD | 4.0 | 1.18 | −35.2 | W |
| 31 | 1,5-PD | 4.4 | 1.18 | −37.2 | W |
| 32 | 1,5-PD | 4.9 | 1.15 | −40.1 | M |
| 33 | 1,5-PD | 5.9 | 1.14 | −44.2 | M-S |
| 34 | 1,5-PD | 6.9 | 1.19 | −46.4 | S |
| 35 | 1,6-HD | 3.5 | 1.20 | −31.2 | W |
| 36 | 1,6-HD | 3.9 | 1.19 | −33.8 | W |

TABLE 8-continued

| Sample | CAT K. | NCl (Cd.) | Mw/Mn | Tg °C. | R. Cry. -10° C. |
|---|---|---|---|---|---|
| 37 | 1,6-HD | 4.9 | 1.17 | -40.2 | M |
| 38 | ND | 3.7 | 1.16 | -32.6 | W |
| 39 | ND | 4.9 | 1.15 | -41.3 | M |
| 40 | NPG | 4.0 | 1.27 | -32.8 | W |
| 41 | NPG | 4.6 | 1.31 | -35.3 | W |
| 42 | NPG | 5.0 | 1.35 | -38.9 | W |
| 43 | NPG | 6.0 | 1.23 | -42.6 | M-S |
| 44 | NPG | 7.0 | 1.23 | -45.5 | S |
| 45 | 3-MPD | 3.9 | 1.21 | -34.8 | W |
| 46 | 3-MPD | 4.5 | 1.15 | -35.2 | W |
| 47 | 3-MPD | 5.1 | 1.33 | -38 | W |
| 48 | 3-MPD | 5.7 | 1.18 | -39.4 | M |
| 49 | 3-MPD | 7.0 | 1.26 | -44 | S |
| 50 | CHDM | 3.8 | 1.18 | -21 | W |
| 51 | CHDM | 4.9 | 1.15 | -34.4 | W |
| 52 | CHDM | 5.8 | 1.16 | -38.8 | M |
| 53 | CHDM | 6.3 | 1.14 | -40.4 | M-S |
| 54 | CHDM | 7.3 | 1.15 | -43.7 | M-S |
| 55 | PXG | 3.9 | 1.26 | -22.2 | W |
| 56 | PXG | 5.2 | 1.21 | -30.3 | W |
| 57 | PXG | 6.2 | 1.26 | -34.9 | M |
| 58 | PXG | 7.2 | 1.14 | -38.4 | M-S |
| 59 | PXG | 8.2 | 1.15 | -41 | S |
| 60 | BHEB | 4.9 | 1.15 | -23.4 | W |
| 61 | BHEB | 5.9 | 1.16 | -28.9 | M |
| 62 | BHEB | 7.0 | 1.14 | -33.2 | M-S |
| 63 | BHEB | 8.0 | 1.14 | -41.2 | S |
| 64 | BPE-20 | 4.8 | 1.19 | -22.1 | W |
| 65 | BPE-20 | 5.9 | 1.19 | -28.9 | W |
| 66 | BPE-20 | 6.8 | 1.18 | -33.8 | M |
| 67 | BPE-20 | 7.8 | 1.18 | -41 | M-S |

CAT: Catalyst, K.: Kinds
NCl(Dd.):Designed values of the number of ε-caprolactone units,
R.Cry.: Relative crystallizability Various crosslinked polyurethanes were obtained from the millable polyurethanes of samples 24, 27, 32, 37, 39, 42, 47, 51, 56, 60, and 64 in the same manner as described above These crosslinked elastomers were measured for hardness (Hs:JIS A scale) according to JIS K6253, ball rebound (Rb:%) according to JIS K6255 (based on ISO 4662), tensile strength (Tb: MPa) and elongation (Eb:%) according to JIS K6251 (based on ISO 37), tear strength using a notched, an angled test piece (Tr:N/mm) according to JIS K6252 (based on ISO 34). Here, the crosslinked elastomers were measured for initial hardness after heating at 60° C. for 30 minutes and standing at 23° C. for 3 hours. Table 9 shows the results obtained.

TABLE 9

| Sample | Ini. | Polyol m.p. | Hs | Rb | Tb | Eb | Tr |
|---|---|---|---|---|---|---|---|
| 24 | EG | 37.1, 42.2 | 54 | 70 | 17.4 | 510 | 28.8 |
| 27 | BD | 36.8, 39.2 | 53 | 72 | 21.2 | 520 | 32.5 |
| 32 | PD | 32.6, 37.5 | 53 | 71 | 15.1 | 500 | 26.6 |
| 37 | HD | 36.6, 40.5 | 54 | 73 | 22.8 | 520 | 33.5 |
| 39 | ND | 44.1 | 55 | 70 | 20.6 | 520 | 30.0 |
| 42 | NPG | 23.2, 34.2 | 55 | 69 | 6.8 | 430 | 20.8 |
| 47 | 3-MPD | 24.4, 35.7 | 54 | 70 | 7.6 | 450 | 22.5 |
| 51 | CHDM | 23.3, 31.1 | 55 | 72 | 18.7 | 500 | 32.3 |
| 56 | PXG | 25.6, 36.0 | 53 | 70 | 20.8 | 520 | 30.5 |
| 60 | BHEB | 27.2, 35.3 | 54 | 68 | 19.6 | 530 | 29.8 |
| 64 | BPE-20 | 15.2, 21.3 | 54 | 62 | 18.1 | 530 | 36.7 |

As a result, it revealed that setting simple parameters such as the kind of polymerization initiator and average number of monomer units enables one to finely or precisely control the crystallizability of the amorphous polymer chain in elastomers. While the crystallizability of crosslinked elastomers can be controlled to some extent by crosslinking or by use of additives, elastomers of the rank "strong" of relative crystallizability are difficult to employ at normal temperature (20° C.) since there is the fear that they could cause inconveniences due to crystallizability. Therefore, in the systems using aliphatic diols as a polymerization initiator, the average number of monomer unit should be 6 or less. In other words, when the average number of monomer units is 7 or more, crystallization occurs even at room temperature so that the polyurethane cannot be used as a polymer chain in elastomers. Further, if the polymerization initiator has a methyl group as a side chain, crystallization decreases but strength also decreases considerably. On the other hand, introduction of substituents which are bulky in a plane such as a benzene ring and a cyclohexane ring, instead of a methyl group, relaxes crystallizability to a suitable extent while at the same time imparting ability of exhibiting orientation crystallizability when stretched, thereby giving elastomers having high strength. When cyclic structures are introduced in the molecule as described above, the crystallizability is relaxed and therefore polyurethanes with an average number of lactone units of up to about 8 can be used. However, since the introduction of cyclic structures also increases the glass transition temperature of the polymer chain, it is desirable to use polyurethanes with an average number of lactone units of 4 or more in order to have a Tg of -20° C. or lower.

Further, according to the present invention, the degree of crystallizability of the amorphous polymer chain as described above can be finely or precisely controlled by selecting the number of caprolactone units, molecular weight distribution of each caprolactone unit, the kind of polymerization initiator $R_1$, and the like. For example, there can be produced without difficulty those amorphous polymer chains that are amorphous when they are not stretched but are highly oriented so that they behave as crystallized polymer chains when they are stretched to show excellent physical properties.

This feature can be more clearly understood by the following tests.

Comparative Tests on Crystallizability

Crystallizability was compared between Group A including Samples 4 and 5 in which the molecular weight distribution of ε-caprolactone was narrow and Group B including Samples 11 and 12 in which the molecular weight distribution of ε-caprolactone was broad.

1. Measurement of Crystallizability of Amorphous Polymer Chain Before Crosslinking, Measured Using a Differential Scanning Calorimeter (DSC)

Figure 6:
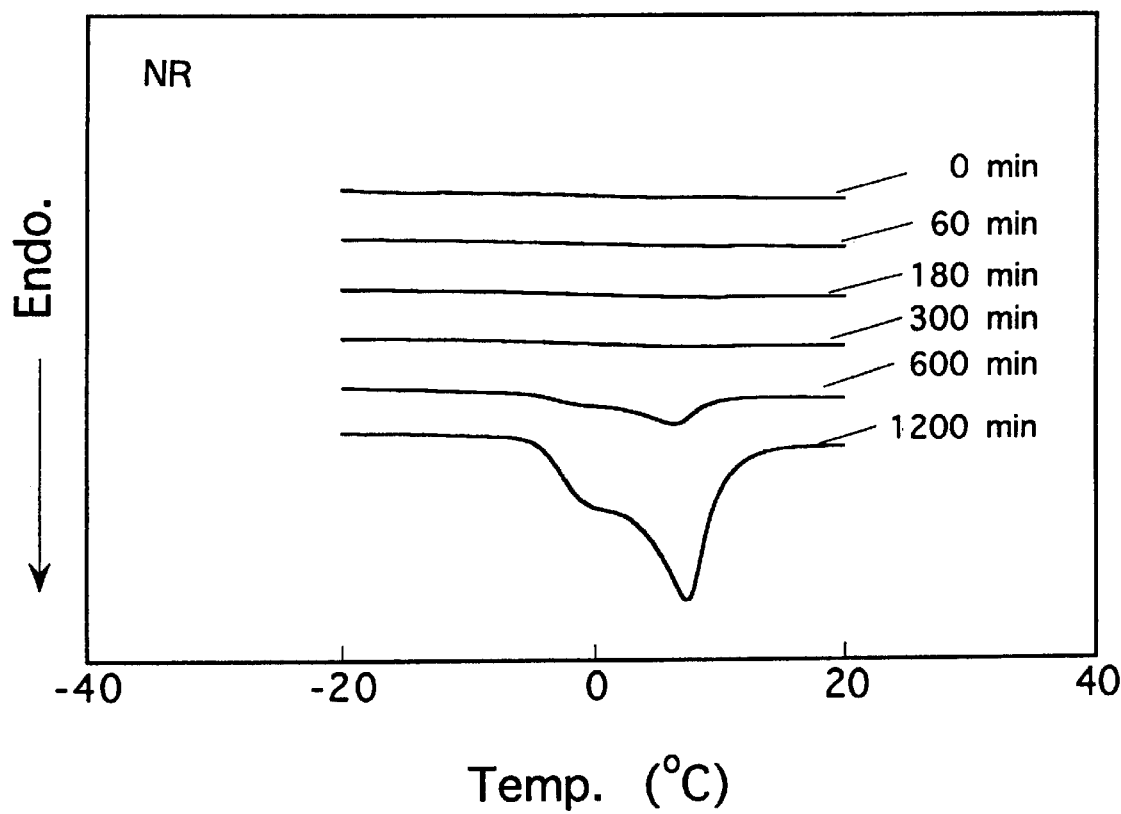
FIG. 6 is a diagram illustrating results of DSC measurement of natural rubber.
Figure 7:
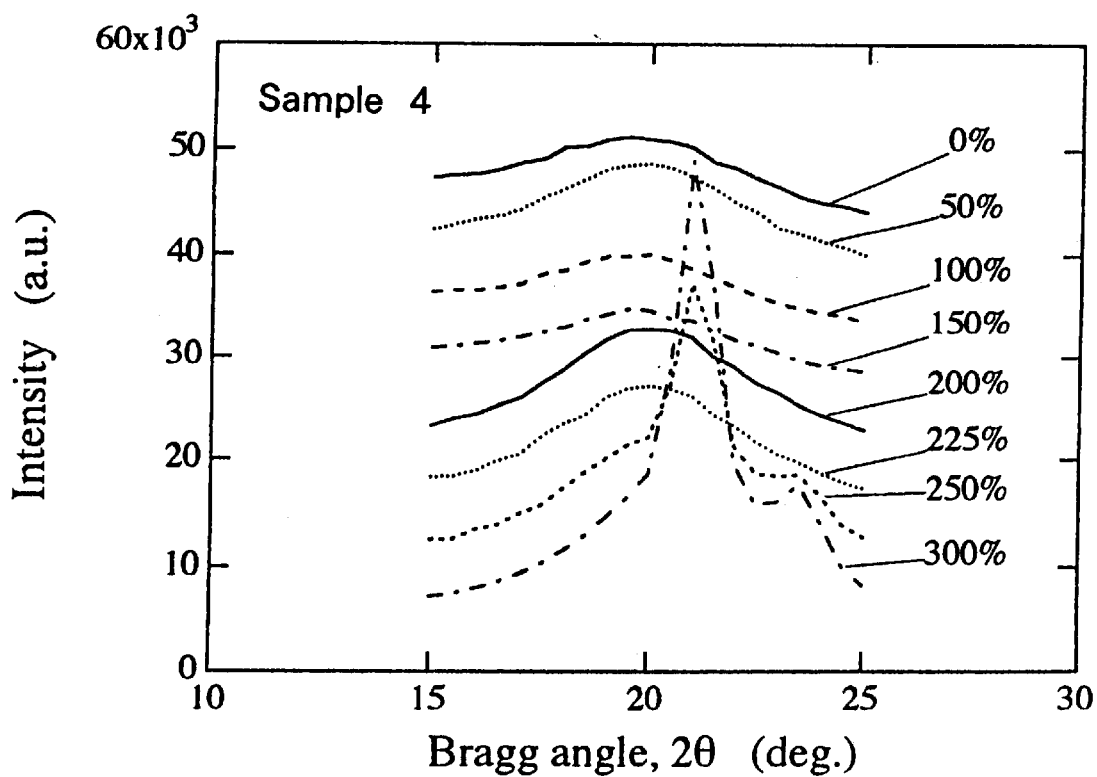
FIG. 7 is a diagram illustrating results of WAXD measurement of Example 3.
Figure 8:
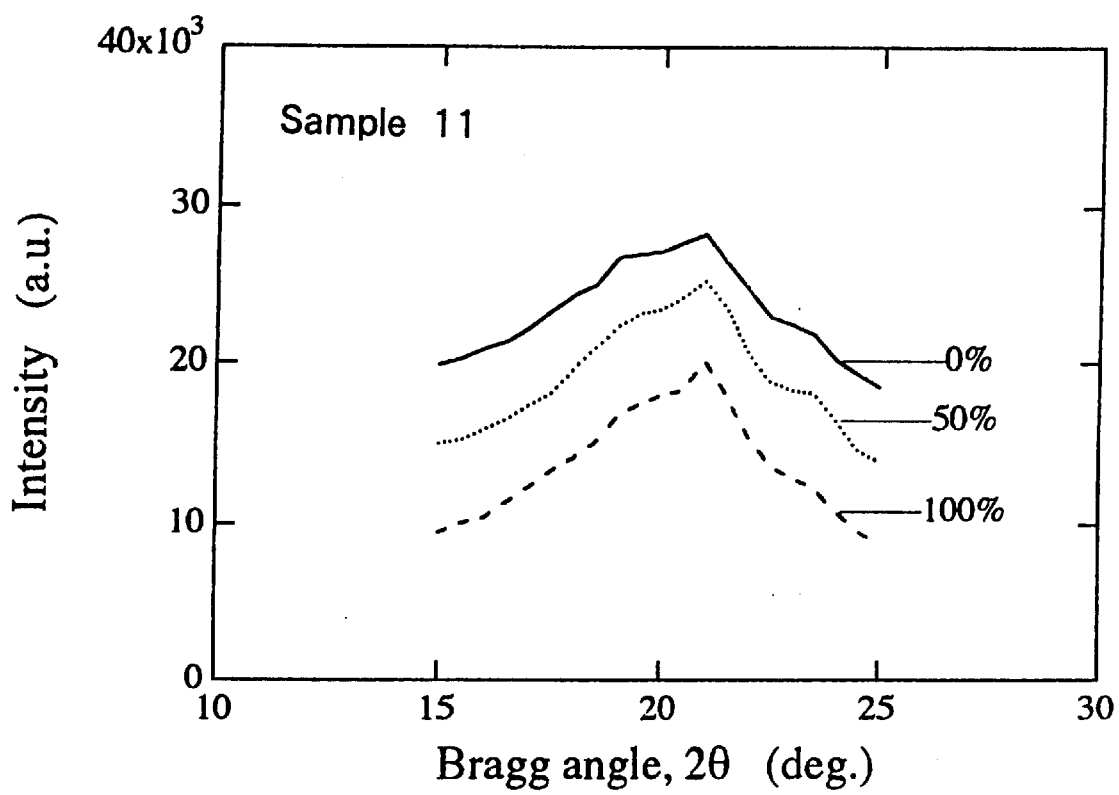
FIG. 8 is a diagram illustrating results of WAXD measurement of Comparative Example 7.
Figure 9:
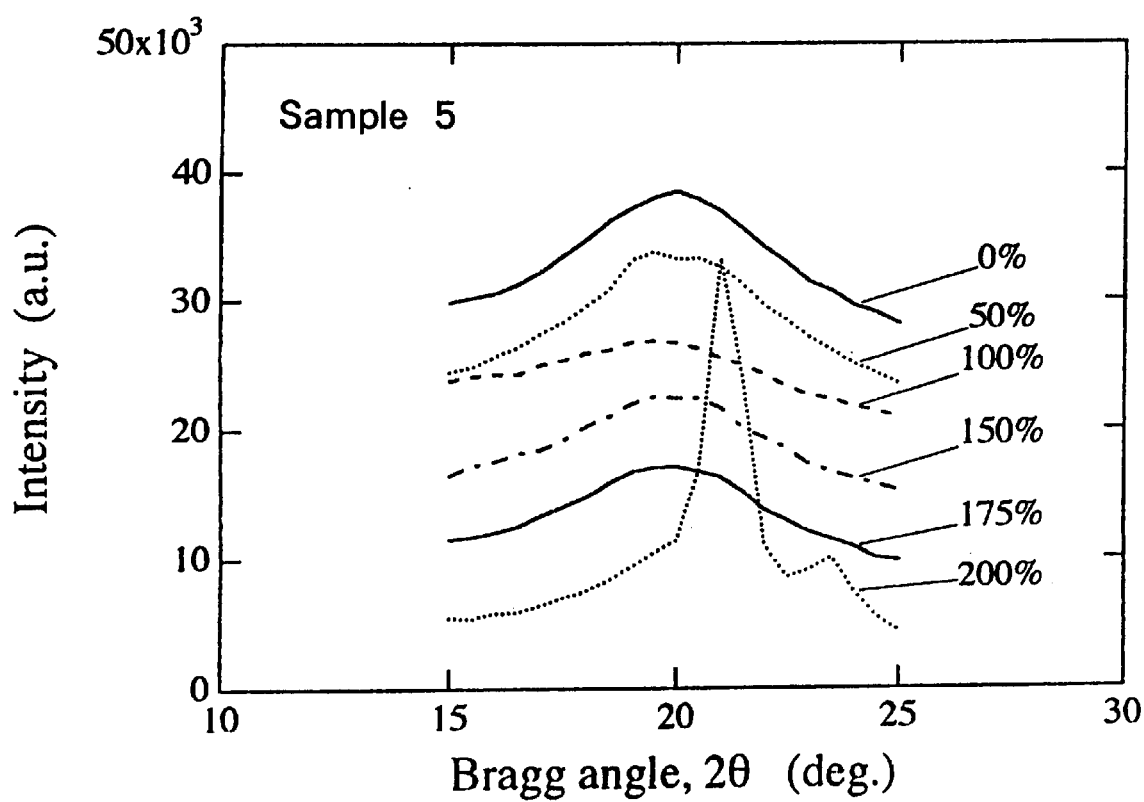
FIG. 9 is a diagram illustrating results of WAXD measurement of Example 4.
Figure 10:
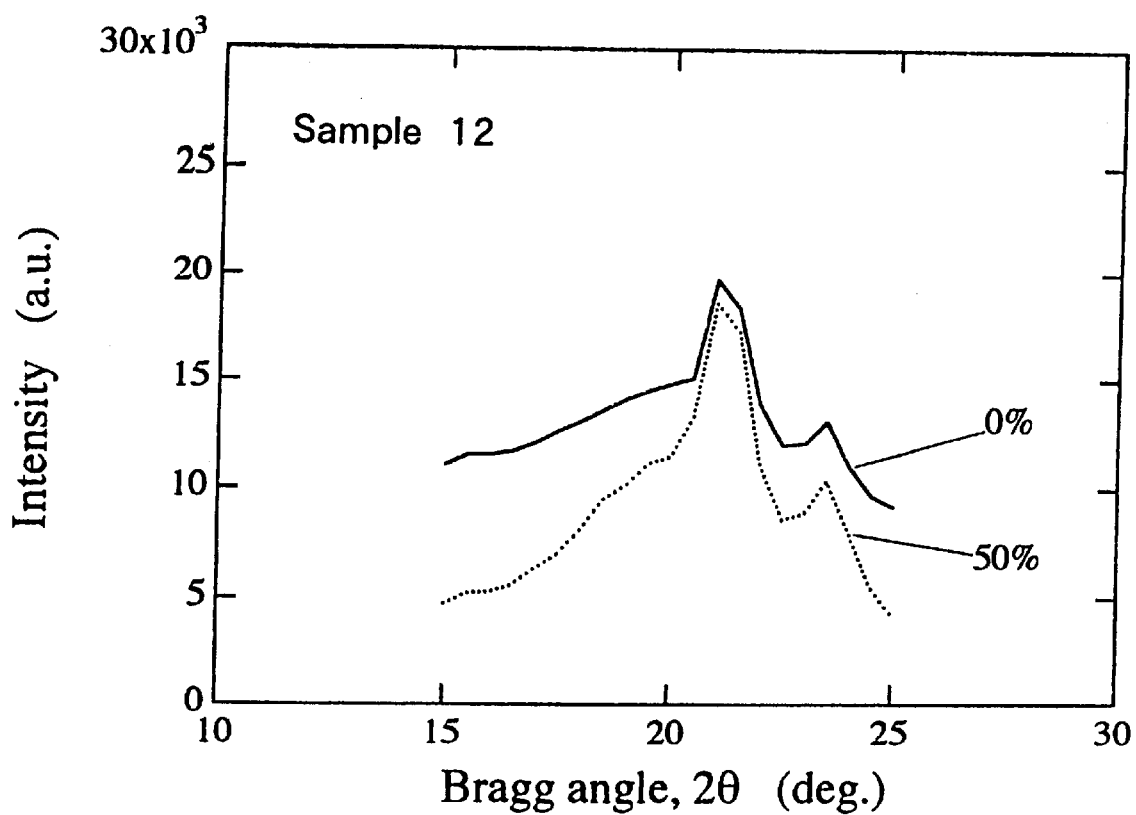
FIG. 10 is a diagram illustrating results of WAXD measurement of Comparative Example 8.

Each sample was measured for the crystallizability of amorphous polymer chain before crosslinking using a differential scanning calorimeter (DSC). FIGS. 2 to 5 illustrate the results of DSC measurements on the behavior of fusion of each sample after holding it at -10° C. for a predetermined time. For comparison, FIG. 6 shows results of DSC measurement on natural rubber (NR).

It was observed that Samples 11 and 12 in Group B with a broad molecular weight distribution showed faster crystallization than Samples 4 and 5 in Group A with a narrow molecular weight distribution. It was observed that the samples with an average number of monomer units of 5 were slower in crystallization than the samples with an average number of monomer units of 6. These observations demonstrate that the use of oligomers having a narrow molecular weight distribution enables one to finely control the crystallizability of the amorphous polymer chain by setting a selected average number of monomer units.

2. Comparison of Crystallization of Crosslinked Elastomers by Measuring Wide Angle X-ray Diffraction (WAXD)

Each sample was measured for wide angle X-ray diffraction of the amorphous polymer chain. FIGS. 7 to 10 illustrate the results of WAXD measurements. Specimens used were each in the form of a 1 mm-thick and 3 mm-wide processed sheet and measurement were conducted at varied elongation (%) at 22° C. Samples 11 and 12 in Group B with a broad molecular weight distribution showed a diffraction peak due to crystallization even when the samples were not stretched. The peak of 2θ=about 21 degree corresponded to the peak position of ε-caprolactone and, hence, it is presumed that crystallization due to stretching of the crosslinked elastomers is attributable to the crystallization of the repeating unit of caprolactone monomers.

On the other hand, Samples 4 and 5 in Group A with a narrow molecular weight distribution were in an amorphous state when they were under the conditions of no or low stretching and from their low glass transition temperature, it is presumed that they can become a rubber elastic body or elastomer. At an increased elongation, crystallization was observed. This indicates that although the samples of the present invention behave as a rubber elastic body under deformation conditions which ordinary elastomers encounter, they are highly oriented and behave similarly to crystallized polymer when they are excessively or drastically deformed as in the case of wear, breakage, or the like. In addition, the degree of crystallization can be finely controlled by adjusting the average number of caprolactone units.

I claim:

1. A method for preparing an amorphous polymer chain in an elastomer having substantially no hard segments and being millable on conventional rubber machinery, which polymer chain results in elastomer after being cross-linked, comprising the steps of:

forming a crystallizable oligomer having a repeating unit comprising regularly arranged monomer units; and reacting said repeating unit at both ends thereof to effect extensions of its chain length;

wherein said method further comprises the steps of:

selecting the kind of said monomer units to be introduced into said repeating unit;

selecting the number of said monomer units in said oligomer from a predetermined range, in order to prevent crystallization by the linkage units and to avoid not having a lower glass transition temperature, so that the number of said monomer units in said oligomer is not higher or lower than the predetermined range;

selecting the molecular weight distribution of said repeating unit, comprising said monomer units being as small as possible in order to avoid a molecular weight more or less than a predetermined range, thereby causing local crystallization and avoiding not having a lower glass transition temperature;

selecting a linkage unit, selected from urethane linkage units and amide linkage units, comprising a compound which reacts with the terminals of said repeating units and inhibits crystallization of said repeating unit after the reaction;

whereby controlling crystallizability of said polymer chain such that a portion including said oligomer has an elastic phase where the crystallizability of said oligomer is limited under normal operational conditions so that it shows rubber elasticity and a highly oriented phase where said portion including said oligomer behaves like a crystallized oligomer when deformed excessively.

2. A method of claim 1 wherein the linkage unit is arranged at both ends of the oligomer.

3. A method of claim 1 wherein the extension of the chain length of the oligomer is effected by polyaddition or polycondensation.

4. A method of claim 1 wherein the amorphous polymer chain has a glass transition temperature of about −20° C. or below.

5. A method of claim 1 wherein the oligomer has a hydroxyl group at each end thereof to form a polyol and the compound which reacts with the oligomer has an isocyanate group at each end thereof, so that the linkage unit is a urethane linkage unit, thereby preparing an amorphous polymer chain in a millable polyurethane.

6. A method of claim 1 wherein the oligomer is formed by ring opening addition of a cyclic monomer to a polymerization initiator so that the oligomer has a repeating unit constituted by monomer units originated from the cyclic monomer, and the initiator constitutes a part of the linkage unit.

7. A method of claim 6 wherein a linkage unit comprising the monomer unit is ε-caprolactone so that the oligomer is represented by formula (I) below wherein [ ] is a ε-caprolactone unit; m and n are numbers of ε-caprolactone units; and $R_1$ is a divalent group derived from a polymerization initiator of formula $R_1(OH)_2$, the poly-ε-caprolactone based diol containing a controlled average number of caprolactone units and having a molecular weight distribution Mw/Mn of about from 1.0 to 1.5.

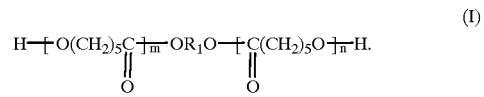

(I)

8. A method of claim 7 wherein the molecular weight distribution Mw/Mn of the poly-ε-caprolactone based diol is about from 1.0 to 1.3.

9. A method of claim 7 wherein a polymerization initiator represented by the formula $R_1(OH)_2$ for the poly-ε-caprolactone based diol is at least one member selected from the group consisting of straight chain glycols having 2 to 12 carbon atoms; diols having up to 12 carbon atoms and having a side chain, and; diols having an unsaturated group containing up to 12 carbon atoms; wherein the caprolactone unit is present in an average number of 3 to 6.

10. A method of claim 9 wherein the diols having up to 12 carbon atoms and having a side chain are selected from the group consisting of neopentyl glycol, and 3-methyl-1,5-pentanediol.

11. A method of claim 9 wherein the diols having an unsaturated group containing up to 12 carbon atoms is 3-allyloxy-1,2-propanediol.

12. A method of claim 9 wherein the polymerization initiator, $RI(OH)_2$, is at least one member selected from the group consisting of straight chain glycols having 2 to 12 carbon atoms, said glycols having no side chain.

13. A method of claim 8 wherein the polymerization initiator, $R_1(OH)_2$, consists of diols having an aromatic or alicyclic ring, wherein the caprolactone unit is present in an average number of 4 to 8.

14. A method of claim 13 wherein the diols having an aromatic ring are selected from the group consisting of 1,4-bis-(hydroxyethoxy)benzene, p-xylene glycol, and alicyclic diols, wherein the caprolactone unit is present in an average number of 4 to 8.

15. A method of claim 14 wherein the diol is at least one alicyclic member selected from the group consisting of cyclohexanediol and cyclohexanedimethanol.

16. A method of claim 5 wherein the polyol further comprises a chain extender.

17. A method of claim 5 wherein the millable polyurethane has a glass transition temperature, Tg, of no higher than about −20° C.

18. The method for preparing an amorphous polymer in an elastomer as claimed in claim 5 wherein the diisocyanate is at least one member selected from the group consisting of 2,6-toluene diisocyanate (TDI), 4,4'-diphenylmethane diisocyanate (MDI), p-phenylene diisocyanate (PPDI), 1,5-naphthalene diisocyanate (NDI), and 3,3-dimethyldiphenyl-4,4'-diisocyanate (TODI).

19. The method of claim 5 wherein the oligomer based diol is prepared under conditions of no higher than about 130° C. using a tin catalyst represented by formula (II) wherein $R_2$ is a hydrogen atom, an alkyl group, or an aryl group; and X is a hydroxyl group, an alkoxide group or a halogen atom other than fluoride.

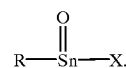

(II)

20. A method of claim 1 wherein the oligomer is a dicarboxylic acid and the compound which reacts with the oligomer is a diamine so that the linkage unit is an amide linkage.

21. The method for preparing an amorophous polymer in an elastomer as claimed in claim 20, wherein said dicarboxmlic acid contains the polycaprolactone repetitions.

* * * * *